(12) United States Patent
Baek et al.

(10) Patent No.: US 10,332,566 B2
(45) Date of Patent: Jun. 25, 2019

(54) METHOD FOR DISPLAYING MENU BASED ON SERVICE ENVIRONMENT ANALYSIS IN CONTENT EXECUTION APPARATUS

(75) Inventors: Wonjang Baek, Gyeonggi-do (KR); Seong Baek Lee, Seoul (KR); John Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 1701 days.

(21) Appl. No.: 12/314,149

(22) Filed: Dec. 4, 2008

(65) Prior Publication Data

US 2009/0150782 A1 Jun. 11, 2009

(30) Foreign Application Priority Data

Dec. 6, 2007 (KR) .......................... 10-2007-0125950

(51) Int. Cl.
*G06F 3/0482* (2013.01)
*G11B 27/34* (2006.01)

(52) U.S. Cl.
CPC ............ *G11B 27/34* (2013.01); *G06F 3/0482* (2013.01); *G11B 2220/2541* (2013.01); *G11B 2220/2562* (2013.01); *G11B 2220/2579* (2013.01)

(58) Field of Classification Search
CPC ....... G06F 3/0482; G06F 3/048; G11B 27/34; G11B 2220/2541; G11B 2220/2562; G11B 2220/2579
See application file for complete search history.

(56) References Cited

U.S. PATENT DOCUMENTS

| | | | | |
|---|---|---|---|---|
| 5,751,672 A | * | 5/1998 | Yankowski | .................. 709/238 |
| 6,182,287 B1 | * | 1/2001 | Schneidewend et al. | ...... 725/48 |
| 6,477,576 B2 | * | 11/2002 | Angwin et al. | ............... 709/226 |
| 7,614,013 B2 | * | 11/2009 | Dollar et al. | .................. 715/851 |
| 2003/0161615 A1 | | 8/2003 | Tsumagari et al. | ............. 386/95 |
| 2004/0220926 A1 | * | 11/2004 | Lamkin et al. | .................... 707/3 |
| 2005/0076127 A1 | * | 4/2005 | Wilson et al. | ................ 709/227 |
| 2006/0110135 A1 | * | 5/2006 | Kawabata et al. | .............. 386/95 |
| 2006/0265753 A1 | * | 11/2006 | Peng et al. | ....................... 726/26 |
| 2007/0011281 A1 | * | 1/2007 | Jhoney | ................... G06Q 40/04 709/220 |
| 2007/0060363 A1 | * | 3/2007 | Nguyen | .................. G07F 17/32 463/42 |
| 2008/0228429 A1 | * | 9/2008 | Huang | .................. G06F 1/1626 702/141 |

FOREIGN PATENT DOCUMENTS

CN 1859663 A 11/2006
EP 1 553 769 A1 7/2005
(Continued)

OTHER PUBLICATIONS

"Microsoft® Windows® XP Professional Administrator's Pocket Consultant, 2nd Edition" by William R. Stanek, Nov. 15, 2004.*
(Continued)

*Primary Examiner* — Rinna Yi
(74) *Attorney, Agent, or Firm* — Brinks Gilson & Lione

(57) ABSTRACT

A method for displaying a menu based on a service environment analysis in a content execution apparatus is disclosed. In accordance with the method for displaying the menu based on the service environment analysis in the content execution apparatus of the present invention, a menu is displayed according to a menu information extracted from a storage media, wherein services available to a user from a content execution apparatus is determined and the menu information is updated according to the availability of services.

5 Claims, 2 Drawing Sheets

(56) References Cited

FOREIGN PATENT DOCUMENTS

| EP | 1 793 605 A1 | 6/2007 |
|---|---|---|
| KR | 2003-0039844 A | 5/2003 |
| KR | 10-2005-0072554 A | 7/2005 |
| KR | 10-2006-0013237 A | 2/2006 |
| KR | 10 2006 0016608 A | 2/2006 |
| KR | 10-2006-0079409 A | 7/2006 |
| KR | 10-0661509 B1 | 12/2006 |
| WO | WO 2006/019275 A1 | 2/2006 |
| WO | WO 2006/078111 A2 | 7/2006 |

OTHER PUBLICATIONS

"The Magic of Drive Mapping" by Kathy Ivens, http://windowsitpro.com/security/magic-drive-mapping, May 26, 2003.*

"Thread: greying out or preventing ListView item selection?" by Simmerheli et al, published Sep. 23, 2006 by Code Guru, downloaded Sep. 25, 2018 from http://forums.codeguru.com/showthread.php?401104-greying-out-or-preventing-ListView-item-selection (Year: 2006).*

"Application Definition Blu-ray Disc Format BD-J Baseline Application and Loginal Model Definition for BD-ROM", Mar. 2005, Blu-ray Disc Association, pp. 1-45.

International Search Report dated Jul. 14, 2009, issued to corresponding International Application No. PCT/KR2008/007137.

European Search Report dated Oct. 11, 2011, issued to corresponding European Application No. 08856570.0.

Apple:"iPhone User's guide", Internet Citation, Jun. 2007 (Jun. 2007), XP002474183, Retrieved from the Internet: URL:http://~.

European Office Action dated Oct. 27, 2014, to the corresponding European Application No. 08856570.0.

* cited by examiner

<Prior Art>

METHOD FOR DISPLAYING MENU BASED ON SERVICE ENVIRONMENT ANALYSIS IN CONTENT EXECUTION APPARATUS

BACKGROUND OF THE INVENTION

1. Field of the Invention

The present invention relates to a method for displaying a menu based on a service environment analysis in a content execution apparatus, and particularly, to a method for displaying a menu based on a service environment analysis in a content execution apparatus wherein a menu is displayed according to menu information extracted from a storage media updated according to an availability of services.

2. Description of the Related Art

A multimedia content may be stored in a disk type storage media, and a user is provided with the multimedia content using a disk media playback apparatus.

As the disk type storage media progresses from a DVD to Blu-ray disk and a HD-DVD, the user may be provided with a high resolution multimedia content.

When the disk media playback apparatus plays the disk type storage media, functions that may be provided by the disk media playback apparatus are displayed on a screen as a menu in order to facilitate a selection of the functions by the user.

FIG. 1 is a diagram exemplifying a menu displayed by a conventional disk media playback apparatus.

As shown in FIG. 1, menu icons 110a through 110f, each of which are associated with a certain service, is displayed on a screen 100 for the user to make the selection.

For instance, the menu icon 110a is associated with a playback service of the multimedia content.

The menu icon 110b is associated with a set-up service of the disk media playback apparatus. For instance, the user may select a language or a subtitle to be displayed when viewing the multimedia content.

The menu icon 110c is associated with a scene selection service for selecting and jumping to a certain scene.

The menu icon 110d is associated with a game service.

The menu icon 110e is associated with a supplementary service for providing an additional information of the multimedia content on directors and actors.

The menu icon 110f is associated with an access service of a homepage of a provider of the multimedia content through a network in order to download a new multimedia content.

The conventional method for displaying the menu is disadvantageous in that only a fixed menu can be displayed on the screen. That is, even when a new information or a new service is available after the manufacturing of the disk type storage media, new menus associated with the new information or the new service cannot be added.

Moreover, when the user selects an unavailable service, the selected service cannot be provided.

One reason for failing to provide the selected service is a difference in system environments of the disk media playback apparatuses.

For instance, when the user selects a network game service in a disk media playback apparatus that is incapable of a network access, an error message is displayed.

Therefore, the above-described problems cause confusion and inconvenience to the user.

SUMMARY OF THE INVENTION

It is an object of the present invention to provide a method for displaying a menu based on a service environment analysis in a content execution apparatus wherein a menu is displayed according to a menu information extracted from a storage media updated according to an availability of services.

In order to achieve the above-described and/or other objects of the present invention, there is provided a method for displaying a menu based on a service environment analysis in a content execution apparatus, the method comprising steps of: (a) extracting a menu information from a storage media; (b) determining whether a service corresponding to the menu information extracted from the storage media is existence; (c) updating the menu information when the content execution apparatus provides the service corresponding to the menu information; and (d) displaying the menu according to the updated menu information.

Preferably, the storage media includes a disk storage media, and wherein the step (a) includes reading the menu information from the disk storage media.

Preferably, the disk storage media stores the menu information therein, and the menu information is stored in the disk storage media to comply with one of a blu-ray specification, a HD-DVD specification and a DVD specification.

Preferably, the storage media includes a non-volatile storage media, and wherein the step (a) includes reading the menu information from the non-volatile storage media.

Preferably, the non-volatile storage media includes one of a flash memory and ROM.

Preferably, the step (b) comprises: (b-1) determining whether the services are available from the content execution apparatus; and (b-2) determining whether the services are available from a service data providing apparatus.

Preferably, the step (b) comprises (b-3) determining whether a network access is available.

Preferably, the step (b) is carried out periodically.

Preferably, the menu information is updated in a manner that the menu displayed in the step (d) corresponds to the services determined to be available in the step (b).

DETAILED DESCRIPTION OF THE INVENTION

A method for displaying a menu based on a service environment analysis in a content execution apparatus in accordance with an aspect of the present invention will now be described in detail with reference to the accompanied drawings.

Figure 1:
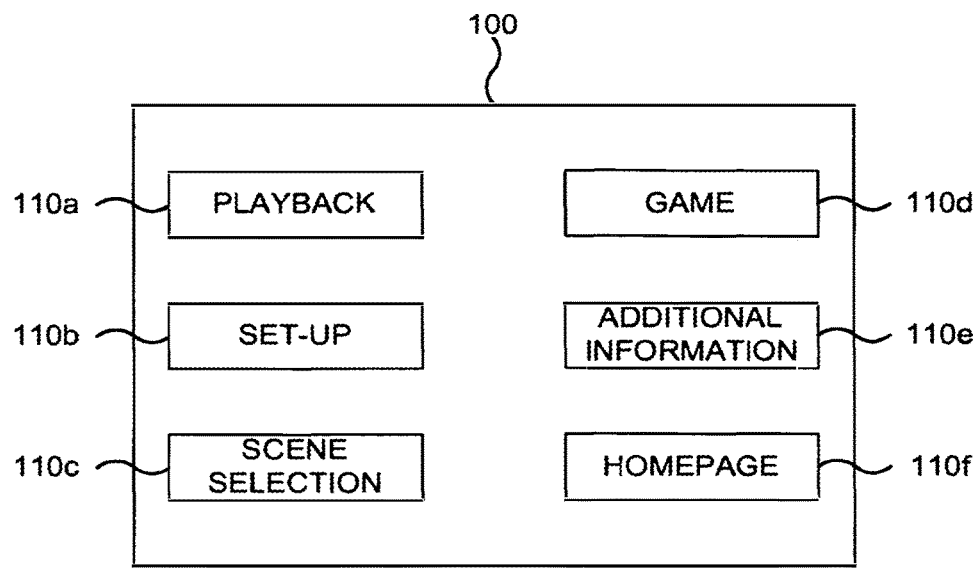
FIG. 1 is a diagram exemplifying a menu displayed by a conventional disk media playback apparatus.
Figure 2:
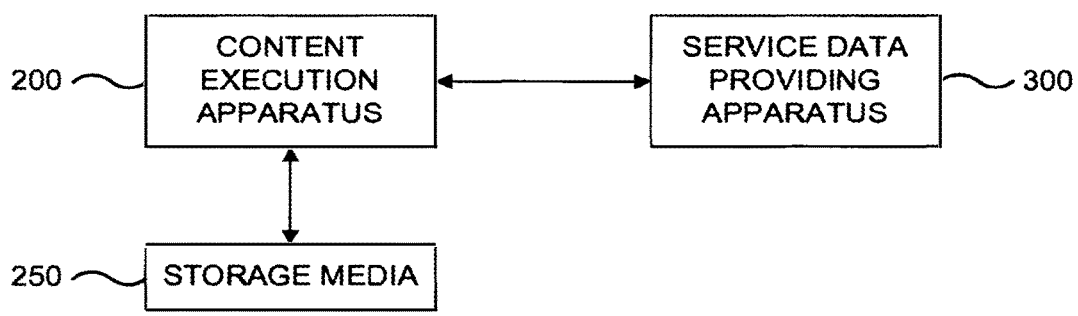
FIG. 2 is a diagram exemplifying a system environment wherein a method for displaying a menu based on a service environment analysis in a content execution apparatus in accordance with an aspect of the present invention is carried out.

FIG. 2 is a diagram exemplifying a system environment wherein a method for displaying a menu based on a service environment analysis in a content execution apparatus in accordance with an aspect of the present invention is carried out.

Referring to FIG. 2, the system environment comprises a content execution apparatus 200 and a service data providing apparatus 300. The system environment may further comprise storage media 250.

The content execution apparatus 200 is capable of providing various services such as a playback service for reproducing a multimedia content including a video stored in an optical disk or a USB memory and a game service for providing a game to a user.

The content execution apparatus 200 may be one of a disk media playback apparatus such as a Blu-ray disk playback apparatus and an HD-DVD playback apparatus.

The service data providing apparatus 300 stores service data and provides the service data to the content execution apparatus 200.

The service data refers to data required for providing the services, i.e., the multimedia content for the playback service, game data for the game service, a data application for an application providing service. In addition, the service data may include image data and text data.

The service data providing apparatus 300 is capable of establishing a communication connection to the content execution apparatus 200.

The storage media 250 stores menu information to be provided to the content execution apparatus 200. The storage media 250 also stores the service data.

It is preferable that the menu information is stored in the storage media 250 in a manner that the menu information complies with one of a Blu-ray specification, an HD-DVD specification and a DVD specification.

Preferably, the storage media 250 includes one of a disk type storage media and a non-volatile storage media.

The non-volatile storage media may include one of a flash memory and a ROM (Read-Only Memory).

The flash memory may have a form of USB memory and be connected to a communication interface of the content execution apparatus 200 to provide the menu information to the content execution apparatus 200.

In addition, the ROM may be installed in the content execution apparatus 200.

A detailed description of the method in accordance with an aspect of the present invention is given below.

Figure 3:
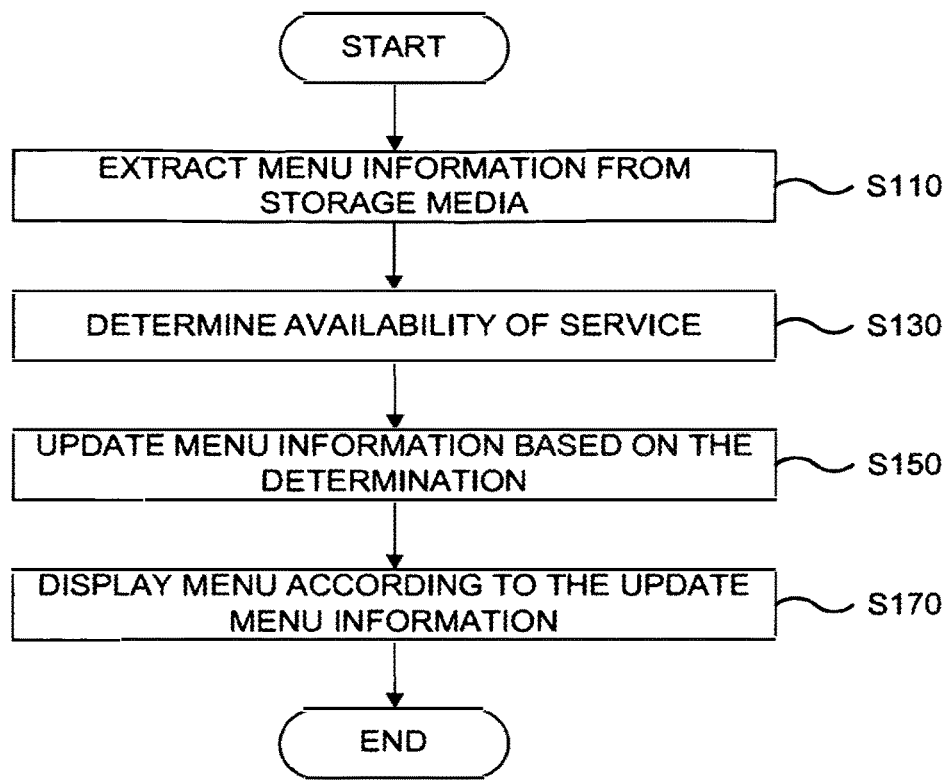
FIG. 3 is a block diagram exemplifying a method for displaying a menu based on a service environment analysis in a content execution apparatus in accordance with an aspect of the present invention.

FIG. 3 is a block diagram exemplifying the method for displaying a menu based on a service environment analysis in a content execution apparatus in accordance with an aspect of the present invention.

Referring to FIG. 3, the content execution apparatus 200 extracts the menu information from the storage media 250 (S110). That is, the content execution apparatus 200 extracts the menu information defining a menu displayed on a screen of a display apparatus connected to the content execution apparatus 200.

For instance, the menu information includes position information of menu icons included in the menu, information on the service associated with the menu icon, and the service data required by the service.

When the menu includes a submenu, the menu icon representing the submenu may be employed in the menu.

The menu information may provided via the storage media 250 including the disk type storage media such as the DVD, the Blu-ray disk or the HD-DVD disk and the non-volatile memory by a manufacturer of the content, or received from the service data providing apparatus 300 and stored in the storage media 250.

Thereafter, availabilities of the service and the service data associated with the menu information are determined (S130). That is, whether the service and the service data corresponding to the menu may be provided to the user is determined. The determination may be carried out periodically.

The menu displayed on the screen is associated with the service. The content execution apparatus 200 provides the service and the service data corresponding to the menu selected by the user.

For instance, when the user selects a certain playback menu icon from the menu displayed on the screen, the content execution apparatus 200 executes the playback service associated with the selected playback menu icon to provide the multimedia content associated with the playback service.

In another example, when the user selects a certain game menu icon from the menu displayed on the screen, the content execution apparatus 200 executes the game service associated with the selected game menu icon to provide the game associated with the game service.

However, only a portion of the service and the service data that may be provided by the content execution apparatus 200 is stored in the content execution apparatus 200. That is, the service and the service data, although defined in the menu information, may not be stored in the content execution apparatus 200. Therefore, the content execution apparatus 200 determines the availability of the service and the service data associated with the menu selected by the user.

If the service and the service data associated with the menu selected by the user are available within the content execution apparatus 200 according to the determination, the content execution apparatus 200 determines a system resource of the content execution apparatus 200 for executing the associated service.

In one example, when the content execution apparatus 200 is to provide a certain game service selected by the user, the content execution apparatus 200 checks for a capacity of a memory thereof, a processing capability of a processor thereof, and an availability of a game engine therein, and determines whether the game service may be executed based thereon.

In another example, when the content execution apparatus 200 is to provide a certain playback service selected by the user, the content execution apparatus 200 checks for an availability of a codec, the capacity of the memory thereof and the processing capability of the processor thereof, and determines whether the playback service may be executed based thereon.

In yet another embodiment, when the content execution apparatus 200 is to provide a network game service, the content execution apparatus 200 checks for an availability of a network access.

When at least one of the service and the service data is not available, the content execution apparatus 200 may receive the service and the service data from a homepage of a manufacturer thereof or the service data providing apparatus 300.

Specifically, the content execution apparatus 200 checks the availability of the network access and receives the service and the service data from the homepage of the manufacturer thereof or the service data providing apparatus 300 when the network access is available.

When the service and the service data are received, the content execution apparatus 200 again determines the system resource thereof for executing the received service and service data.

When the service and the service data are not available at all, that is, when the service and the service data are not available in the content execution apparatus 200 and from the service data providing apparatus 300, the content execution apparatus 200 checks for an availability of description data.

The description data provides information on the service and/or the service data selected by the user and may include the text data and/or the image data associated with the service and the service data.

When the description data is available, the menu corresponding to the service may be displayed despite the unavailability of the service and the service data.

Thereafter, the menu information is updated to display the menu corresponding to the available services (S150).

For instance, when the content execution apparatus 200 is incapable of providing the game service or the network access, the corresponding menu may be deleted.

However, even when the content execution apparatus 200 is incapable of providing the service and/or the service data, the corresponding menu is not required to be deleted if the description data is available. That is, when the description data is available, the corresponding menu is associated with the description data and displayed on the screen.

In addition, instead of deleting the menu, at least one of a title of the menu and the menu icon may be changed. For instance, in case that the content execution apparatus 200 is incapable of providing the network game service but is capable of providing the game service locally playable, the menu information may be updated such that the menu associated with the game service has a title of "GAME" instead of "NETWORK GAME". Similarly, the menu icon associated with the network game service may be changed from "GAME" to "NETWORK GAME". The menu icon representing a certain service may be received from the service data providing apparatus 300.

Thereafter, the menu is displayed according to the update menu information (S170).

Figure 4:
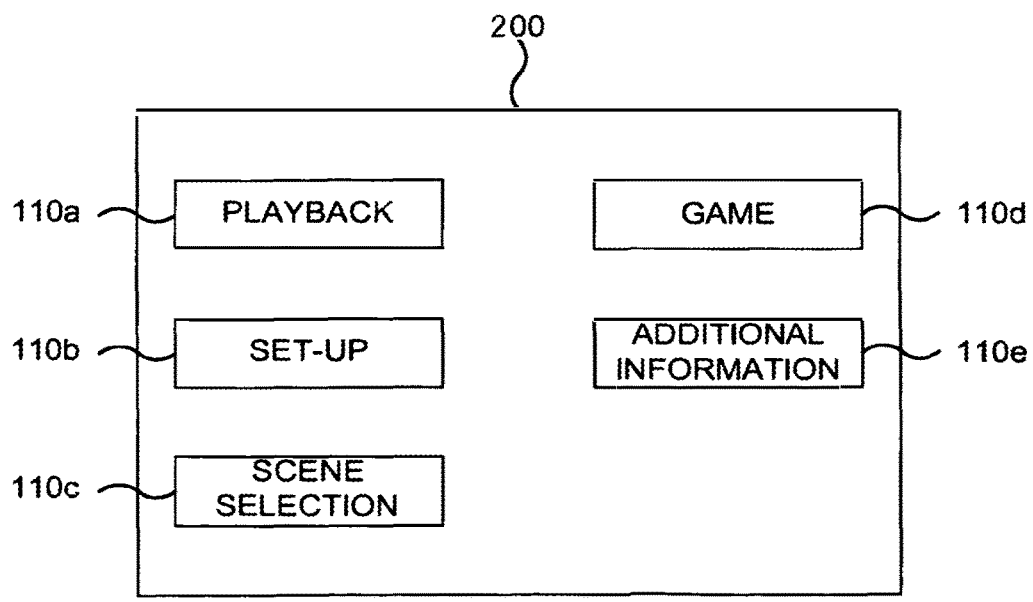
FIG. 4 is a diagram exemplifying a menu displayed according to a method for displaying a menu based on a service environment analysis in a content execution apparatus in accordance with an aspect of the present invention.

FIG. 4 is a diagram exemplifying the menu displayed according to the method in accordance with an aspect of the present invention, wherein the menu updated in the step S150 is displayed on the screen of the display apparatus connected to the content execution apparatus 200.

As shown in FIG. 4, the content execution apparatus 200 displays menu icons 110a through 110e corresponding to the menu updated according to the updated menu information when the network access is determined to be not available.

As described above, in accordance with the method according to an aspect of the present invention, an inconvenience and a confusion such as a mis-operation of the content execution apparatus 200 and an undesired error message are prevented because only the menu corresponding to the available service is displayed.

Moreover, the manufacturer of the content may provide the menu information for a service that is unavailable at the time of the manufacturing in order to expand the service later.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for displaying a menu including a plurality of menu icons for providing services based on a service environment analysis in a content execution apparatus, wherein the content execution apparatus is disk media playback apparatuses including a Blu-ray disk playback apparatus and a HD-DVD playback apparatus, the method comprising steps of:

(a) displaying, by the content execution apparatus, the menu including the plurality of menu icons associated with multimedia content on a screen of the content execution apparatus for user selection, wherein each of the plurality of the menu icons is associated with a respective service, wherein the services include a playback service, a set-up service of the content execution apparatus, a supplementary service for providing an additional information of the multimedia content on directors or actors, and an access service of a homepage of a provider of the multimedia content;

(b) extracting, by the content execution apparatus, menu information defining the menu icons displayed on the screen of the content execution apparatus from a storage media, wherein the menu information includes at least a position information of each of the menu icons included in the menu, an information of the service associated with each of the menu icons, and the service data required by the service;

(c) periodically determining, by the content execution apparatus, whether the services and the service data associated with the extracted menu information are available, wherein step (c) comprises sub-steps of:
  (c-1) determining, by the content execution apparatus, whether the services are available in the content execution apparatus;
  (c-2) determining, by the content execution apparatus, whether a network access to a service data providing apparatus for providing service data to the content execution apparatus is available; and
  (c-3) determining, by the content execution apparatus, whether the services are available from the service data providing apparatus through the Network access;

(d) when the service and the service data associated with a menu icon selected by a user, determining, by the content execution apparatus, a system resource of the content execution apparatus for executing the service corresponding to the selected menu icon, wherein the system resource includes a memory capacity of the content execution apparatus and a processing capability of the content execution apparatus;

(e) when at least one of the service and the service data associated with the selected menu icon is unavailable, checking, by the content execution apparatus, for an availability of the network access, wherein step (e) comprises sub-steps of:
  (e-1) when the network access is available, receiving, by the content execution apparatus, the service and the service data associated with the selected menu icon from a homepage of a manufacturer or the service data providing apparatus via the network access;
  (e-2) when the network access is unavailable, checking, by the content execution apparatus, for an service available locally in the content execution apparatus and updating the menu information by changing a title of the selected menu icon reflecting the locally available service in the content execution apparatus for displaying the updated menu icon including the changed title of the menu icon;
(f) when none of the service and the service data associated with the menu icon is available, checking, by the content execution apparatus, for availability of description data which describes information about the unavailable service, wherein step (f) comprises sub-steps of:
(f-1) when the description data is available, updating, by the content execution apparatus, the extracted menu information displaying the updated menu icon with the description data, wherein the description data provides information of the available service and the service data associated with the menu icon with text data and image data;
(f-2) when the description data is unavailable, updating, by the content execution apparatus, the extracted menu information and delete the menu icon corresponding to the unavailable service;
(g) displaying the updated menu with the updated menu icons on the screen of the content execution apparatus according to the updated menu information based on the determination of the availability of the service and the service data on each of the menu icons.

2. The method in accordance with claim 1, the storage media includes a disk storage media.

3. The method in accordance with claim 2, wherein the disk storage media stores the menu information therein, and the menu information is stored in the disk storage media to comply with one of a blu-ray specification, an HD-DVD specification, and a DVD specification.

4. The method in accordance with claim 1, wherein the storage media includes a non-volatile storage media.

5. The method in accordance with claim 4, wherein the non-volatile storage media includes one of a flash memory and ROM.

* * * * *